US006064476A

United States Patent [19]

Goltsos

[11] Patent Number: 6,064,476

[45] Date of Patent: May 16, 2000

[54] SELF-TARGETING READER SYSTEM FOR REMOTE IDENTIFICATION

[75] Inventor: William Goltsos, Burlington, Mass.

[73] Assignee: Spectra Science Corporation, Providence, R.I.

[21] Appl. No.: 09/197,650

[22] Filed: Nov. 23, 1998

Related U.S. Application Data

[60] Provisional application No. 60/066,837, Nov. 25, 1997.

[51] Int. Cl.[7] ........ G01J 1/00

[52] U.S. Cl. ........ 356/213; 209/3.3

[58] Field of Search ........ 356/417, 317, 356/375, 376; 250/458.1, 459.1, 461.1, 461.2, 548; 209/3.3, 579, 583

[56] References Cited

U.S. PATENT DOCUMENTS

| | | | |
|---|---|---|---|
| 3,739,177 | 6/1973 | Ko | 250/206 |
| 4,036,365 | 7/1977 | Rosenfeld | 209/73 |
| 4,533,244 | 8/1985 | Kaule et al. | 356/71 |
| 4,990,322 | 2/1991 | Pollock et al. | 423/499 |
| 5,434,878 | 7/1995 | Lawandy | 372/43 |
| 5,443,164 | 8/1995 | Walsh et al. | 209/580 |
| 5,448,582 | 9/1995 | Lawandy | 372/42 |
| 5,629,953 | 5/1997 | Bishop et al. | 372/39 |
| 5,881,886 | 3/1999 | Lawandy | 209/3.3 |

FOREIGN PATENT DOCUMENTS 0 552 539 A1 7/1993 European Pat. Off. .

OTHER PUBLICATIONS

"Photonic textile fibers", R. M. Balachandran et al., Applied Optics, vol. 35, No. 12, Apr. 20, 1996, pp. 1991–1994.

"Laser Thread: RF Durability with Less Cost", UTSA Today, Jan. 1997, pp. 1, 5.

*Primary Examiner*—Frank G. Font

*Assistant Examiner*—Tu T. Nguyen

*Attorney, Agent, or Firm*—Ohlandt, Greeley, Ruggiero & Perle, L.L.P.

[57] ABSTRACT

A method and apparatus for identifying articles is disclosed. The method includes steps of: (a) providing a plurality of articles, each of the articles having at least one portion that includes a photonically active material; (b) for each article, illuminating the at least one portion with light from a stimulus source; (c) identifying a location of the at least one portion by detecting an emission from the photonically active material; (d) pointing an excitation source at the identified location; and (e) illuminating the at least one portion within the identified location with light from the excitation source. A next step detects an information-encoded emission from the photonically active material in response to the light from the excitation source. An optional step (g) sorts the articles based on the detected emission.

46 Claims, 6 Drawing Sheets

RESONANCE CONDITION $$m\lambda_m = \pi D n_{eff}$$

| VOLTAGES | Vx1 | Vx2 | Vx3 | Vx4 | Vx5 |
|---|---|---|---|---|---|
| Vy1 | 6,3 | 5,3 | 4,3 | 2,3 | 1,3 |
| Vy2 | 5,4 | 4,4 | 3,3 | 2,5 | 1,4 |
| Vy3 | 5,5 | 4,5 | 3,4 | 1,6 | 0,4 |
| Vy4 | 4,6 | 3,6 | 2,4 | 1,7 | 0,5 |
| Vy5 | 3,7 | 2,7 | 1,5 | 1,8 | 0,6 |

TABLE 1

FIG.6B

| PIXELS | 6 | 5 | 4 | 3 | 2 | 1 | 0 |
|---|---|---|---|---|---|---|---|
| 3 | Vx1, Vy1 | Vx2, Vy1 | Vx3, Vy1 | Vx3, Vy2 | Vx4, Vy1 | Vx5, Vy1 | |
| 4 | | Vx1, Vy2 | Vx2, Vy2 | Vx3, Vy3 | Vx3, Vy4 | Vx5, Vy2 | Vx5, Vy3 |
| 5 | | Vx1, Vy3 | Vx2, Vy3 | | Vx4, Vy2 | Vx3, Vy5 | Vx5, Vy4 |
| 6 | | | Vx1, Vy4 | Vx2, Vy4 | | Vx4, Vy3 | Vx5, Vy5 |
| 7 | | | | Vx1, Vy5 | Vx2, Vy5 | Vx4, Vy4 | |
| 8 | | | | | | Vx4, Vy5 | |

TABLE 2

FIG.6C

SELF-TARGETING READER SYSTEM FOR REMOTE IDENTIFICATION

CROSS-REFERENCE TO RELATED APPLICATIONS

Priority is herewith claimed under 35 U.S.C. §119(e) from copending Provisional Patent Application Ser. No.: 60/066,837, filed May 25, 1997, entitled "Self-Targeting Reader System For Remote Identification", by William Goltsos. The disclosure of this Provisional Patent Application is incorporated by reference herein in its entirety.

FIELD OF THE INVENTION

This invention relates generally to optically-based methods and apparatus for identifying articles and, specifically, to methods and apparatus for identifying optically coded articles.

BACKGROUND OF THE INVENTION

In U.S. Pat. No. : 5,448,582, a multi-phase gain medium is disclosed as having an emission phase (such as dye molecules) and a scattering phase (such as $TiO_2$). A third, matrix phase may also be provided in some embodiments. Suitable materials for the matrix phase include solvents, glasses and polymers. The gain medium is shown to provide a laser-like spectral linewidth collapse above a certain pump pulse energy. The gain medium is disclosed to be suitable for encoding objects with multiple-wavelength codes, and to be suitable for use with a number of substrate materials, including polymers and textiles.

A class of industrial problems exist in which a large number of items must be separated, identified, counted and/or sorted. Present day methods cover a broad spectrum of solutions. One solution applicable to macroscopic and visually identifiable items involves a manual process wherein workers sequentially select items from among many items in a group by identifying an intrinsic characteristic of an item or by a visually-readable coding system that is incorporated into the item. Once selected, the items are directed, either manually or by use of a conveyance, to a location where items possessing a common attribute are stored or further processed. In cases where inventory control is of interest, the selected items can be counted and tabulated either manually by some direct action by a worker or automatically as the selected item passes through a counting device.

In the commercial laundry industry, for example, rental garments are returned in unsorted groups and washed. Workers select single garments, place the garments on a hanger and subsequently onto a conveyor which deposits the garments into one of several holding areas. An appropriate one of the several holding areas is chosen for an individual garment based on a man-readable code applied onto the garment, usually inside the collar, which identifies some attribute common to all garments in a holding location. Typically, attributes include, for example, a day of the week, a route number, or an end user name. Similarly, in the linen supply industry, linens are delivered to a laundry in large, unsorted groups. Workers select individual linen items from a group and identify each item by a characteristics thereof, for example, color, shape and/or size. The selected and identified item is then directed to an appropriate area for washing by a specific wash formulation.

As can be appreciated, the manual labor to identify, count, sort and tabulate items (e.g., linen and/or garment items) has numerous limitations. A limitation in processing throughput is of particular interest herein. In some laundries about 100,000 or more individual items must be processed in a single 8-hour work shift. Since workers are required to perform multiple tasks on each item (e.g., identify, count and sort each item), only a limited number of items can be processed by a typical worker in an 8-hour shift. Further, the burden of manually performing multiple tasks on each item may also lead to inaccuracies in the identifying, sorting and counting processes.

In an effort to eliminate, or at least to minimize, the limitations in the manual processes outlined above, automated solutions have been sought. Conventional automated processes have been developed to improve the accuracy of and to minimize the labor required to identify, count and sort individual items. For example, bar code labels (typically interleaved 2 of 5 symbology) and Radio Frequency (RF) chips have been employed by laundries to achieve these results. These techniques, however, do have limited longevity particularly since the labels and chips are exposed to the harsh industrial laundry environment. Additionally, a solution which employs the bar coded labels suffers for it is time consuming and, at times, extremely difficult to locate a label on a large item when the label is not properly aligned with, i.e. in a field of view of, the bar code reading device. While RF chips do not suffer from the alignment problem, RF chips are troublesome due to their unproven longevity and high costs.

In copending U.S. patent application Ser. No.: 08/842,716, now U.S. Pat. No. 5,881,886 an alternate method of identifying items is disclosed. In this alternate method, photonically active materials, such as patches, labels and threads, can be affixed to garments and linens. A suitable selection of the materials each having, for example, a distinct and uniquely identifiable narrow-band lasing emission are utilized to form optically identifiable codes. The codes permit the identification of the garments, linens and other articles. In one embodiment, two or more fibers or threads, herein after referred to as LaserThread™, exhibit detectable emissions that are incorporated into the garments, linens and other articles to optically encode information into these articles. For example, LaserThread™ may be incorporated into garment labels for uniquely identifying a rental garment, or characteristics thereof, during processing. Similarly, LaserThread™ may be sewn into borders of linens, e.g., into the hem of a table linen, for uniquely identifying linens and/or characteristics thereof.

As is noted in the above-referenced copending U.S. Patent Application, LaserThread™ emits laser-like emissions when excited with, for example, a laser having specific wavelength, pulse energy and pulse duration. Generally, the required excitation laser has a wavelength in the red to blue region of the visible spectrum and can provide radiant energy densities on the order of, for example, about 10 milliJoules per square centimeter when an about 10 nanosecond pulse is directed at the LaserThread™. Exemplary excitation sources include, for example, flashlamp-pumped, Q-switched, frequency doubled Nd:YAG lasers, diode-pumped, Q-switched, frequency-doubled Nd:YAG lasers, and sources derived from other nonlinear products involving principally Nd:YAG lasers or other laser crystals.

However, commercially available excitation sources suitable to excite photonically active materials such as, for example, LaserThread™, can be costly. Therefore, it can be appreciated that an identification system design which maximizes the efficiency of excitation pulse energy is important. It can further be appreciated that the efficiency of excitation pulse energy can be maximized by tightly controlling the location and orientation of photonically active materials incorporated within an article to be evaluated. If tight controls are maintained, then a narrow excitation beam of fixed orientation can impinge on the photonically active materials incorporated within the article to be evaluated with a predictable degree of certainty. Alternatively, if the controls of the location and orientation of the photonically active materials are relaxed, then a targeting system is needed to locate the photonically active materials incorporated into the articles such that an excitation beam can be directed to excite the materials.

As was discussed above, the ability to tightly control the orientation of photonically active materials incorporated within an article under evaluation is particularly troublesome during various processing operations. For example, a region of the article containing the material may be soiled or otherwise obstructed and, thus, the irradiation of the photonically active materials is prevented. Therefore, the inventor has realized that it is advantageous to employ a targeting system and an identification system with processes for separating, identifying, counting and optionally sorting articles.

OBJECTS AND ADVANTAGES OF THE INVENTION

It is a first object and advantage of this invention to provide improved methods and apparatus for identifying and optionally sorting articles that overcomes the foregoing and other problems.

It is another object and advantage of this invention to provide improved methods and apparatus for identifying articles based upon an emission detected from an article.

It is a further object and advantage of this invention to provide methods and apparatus for identifying articles that includes an acquisition of luminous materials incorporated within or upon a surface of an article, a directed excitation of the luminous materials, and a detection of an emission of the luminous materials to identify and (optionally) sort the article.

Further objects and advantages of this invention will become more apparent from a consideration of the drawings and ensuing description.

SUMMARY OF THE INVENTION

The foregoing and other problems are overcome and the objects and advantages are realized by methods and apparatus in accordance with embodiments of this invention.

A method of the present invention includes steps of: (a) providing a plurality of articles to be identified, each of the articles having at least one portion that includes a photonically active material; (b) for each article; illuminating the at least one portion with light from a stimulus source; (c) identifying a location of the at least one portion by detecting an emission from the photonically active material; (d) pointing an excitation source at the identified location; (e) illuminating the at least one portion within the identified location with light from the excitation source; and (f) detecting a narrow-band laser-like or secondary emission from the photonically active material in response to the light from the excitation source. An optional step of sorting the articles based on the detected laser-like or secondary emission can also be accomplished. The detected laser-like or secondary emission conveys information in the form of an optical code for identifying at least one characteristic of the article during processing operations.

In accordance with the present invention, an apparatus for identifying articles includes a device for conveying each article through a field of view of the apparatus. A stimulus source generates light which illuminates at least one portion of the article within the field of view. In the present invention, the at least one portion includes a photonically active material. In response to the light from the stimulus source the photonically active material emits a fluorescent emission. A device identifies a location of the at least one portion by detecting the emission from the photonically active material. An excitation source generates light that exceeds a threshold fluence. A pointing device directs the excitation source at the identified location such that the light from the excitation source illuminates the at least one portion within the identified location. In response to the light from the excitation source, the photonically active material emits a narrow-band laser-like or secondary emission. An optical detector detects the narrow-band laser-like or secondary emission from the photonically active material. The detected laser-like or secondary emission conveys an optical code for identifying at least one characteristic of the article. The at least one characteristic may then be utilized to identify and to, optionally, sort the articles.

BRIEF DESCRIPTION OF THE DRAWINGS

The above set forth and other features of the invention are made more apparent in the ensuing Detailed Description of the Invention when read in conjunction with the attached Drawings, wherein:

FIGS. 6B and 6C are exemplary calibration-related tables;

DETAILED DESCRIPTION OF THE INVENTION

Figure 1:
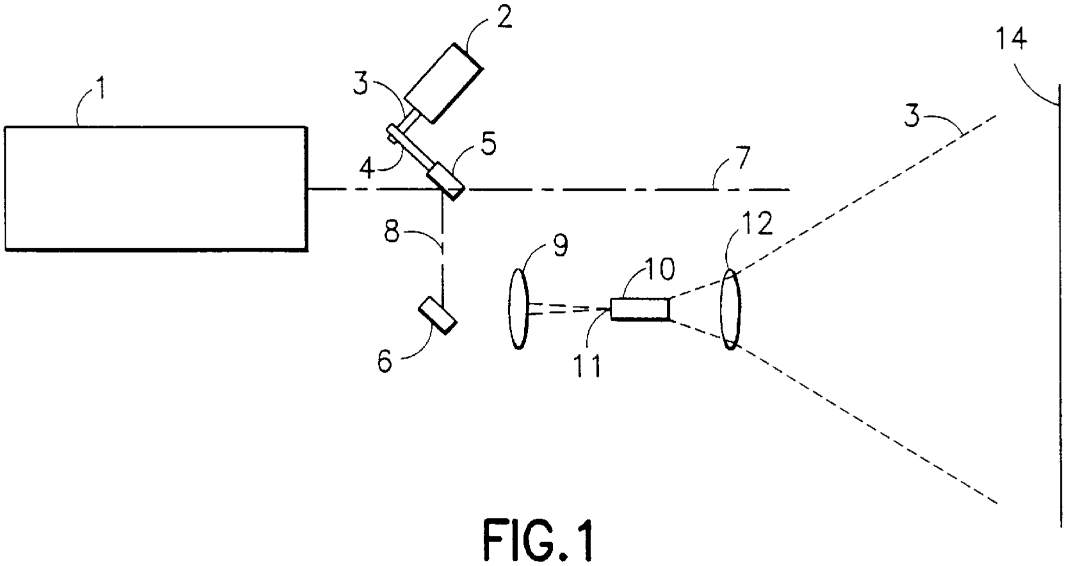
FIG. 1 illustrates an excitation source constructed in accordance with the present invention.

The disclosure of U.S. Pat. No. : 5,448,582, issued Sep. 5, 1995, entitled "Optical Sources Having a Strongly Scattering Gain Medium Providing Laser-Like Action", by Nabil M. Lawandy is incorporated by reference herein in its entirety.

This invention can employ a laser-like emission, such as one exhibiting a spectrally and temporally collapsed emission, or a secondary emission. A secondary emission can be any optical emission from a photonically active material that results directly from the absorption of energy from an excitation source. Secondary emissions, as employed herein, may encompass both fluorescence and phosphorescence.

It should thus be realized at the outset that the teachings of this invention could be employed to identify articles that have been coded with materials not exhibiting laser-like action, such as phosphor particles, dyes (without scatterers) and semiconductor materials. One particularly suitable type of semiconductor materials are fabricated to form quantum well structures which emit light at wavelengths that can be tuned by fabrication parameters.

As such, in one aspect this invention employs an optical gain medium that is capable of exhibiting laser-like activity or other emissions from the medium when excited by a source of excitation energy, as disclosed in the above-referenced U.S. Pat. No. 5,448,582. The optical gain medium can be comprised of a matrix phase, for example a polymer or substrate, that is substantially transparent at wavelengths of interest; and an electromagnetic radiation emitting and amplifying phase, for example a chromic dye or a phosphor. In some embodiments the optical gain medium also comprises a high index of refraction contrast electromagnetic radiation scattering phase, such as particles of an oxide and/or scattering centers within the matrix phase.

The teaching of this invention can employ a dye or some other material that is capable of emitting light, possibly in combination with scattering particles or sites, to exhibit electro-optic properties consistent with laser action; i.e., a laser-like emission that exhibits both a spectral linewidth collapse and a temporal collapse at an input pump energy above a threshold level.

In a further aspect, and as was indicated above, this invention employs a secondary emission that can be any optical emission from a photonically active material that results directly from the absorption of energy from an excitation source. Secondary emissions can include both fluorescent and phosphorescent emissions.

The invention can be applied to the construction of articles, for example, a garments or linens, wherein the article further includes at least one portion containing the gain medium for providing a narrow-band (e.g., about 3 nm) optical radiation emission in response to pump energy above a threshold fluence. The narrow-band optical radiation emission permits the identification (and possible sorting) of the article.

An elongated filament structure such as a thread, for example, LaserThread™, includes electromagnetic radiation emitting and amplifying material. The electromagnetic radiation emitting and amplifying material, possibly in cooperation with scatterers, provides the laser-like emission, as described above. In one embodiment of the invention, one or more elongated filament structures that are, for example, about 5–50 $\mu$m in diameter, are disposed on or within at least one region of a garment or a linen. A plurality of emission wavelengths can be provided, thereby wavelength encoding the garment or linen.

In accordance with another aspect of the present invention, a structure employing one or more optical gain medium films deposited around a core provides the laser-like emission, as described above. The structure may be of various geometries including beads, disks and spheres. The beads, disks and spheres being incorporated into an article to permit the identification and optional sorting of the article during processing operations. For example, copending and commonly-assigned Provisional patent application Ser. No.: 60/086,126, filed May 2, 1998, entitled "Cylindrical Micro-Lasing Beads For Combinatorial Chemistry and Other Applications", by Nabil M. Lawandy, discloses a microlasing cylindrical bead structure suitable for practicing this aspect of the present invention. The disclosure of this Provisional Patent Applications is incorporated by reference herein in its entirety.

Figure 7A:
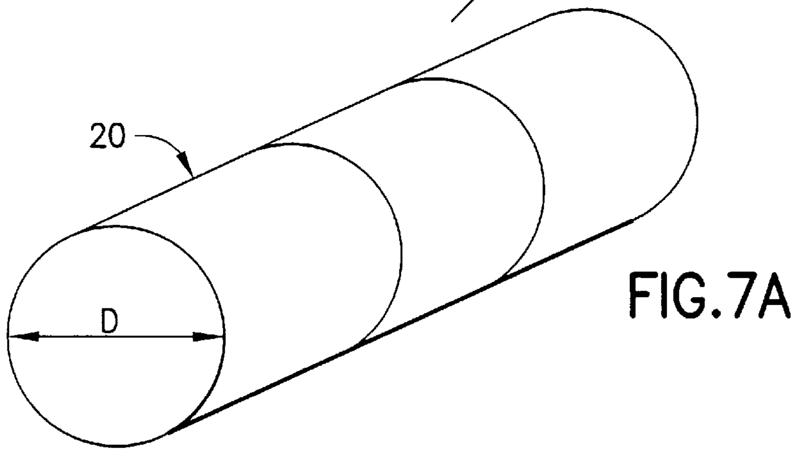
FIG. 7A is an enlarged elevational view of a microlasing cylindrical bead structure suitable for incorporation into an article in accordance with the present invention.
Figure 7B:
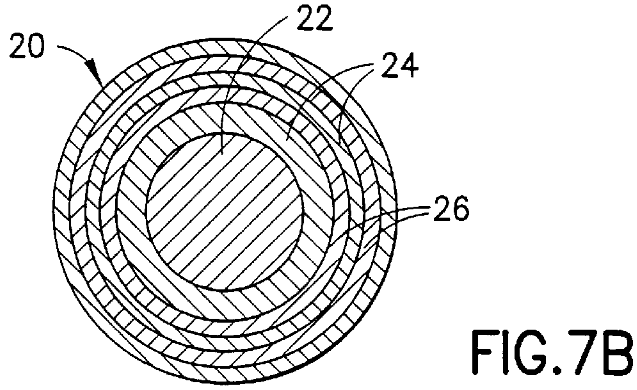
FIG. 7B is an enlarged cross-sectional view of the microlasing cylindrical bead structure of FIG. 7A.

In FIG. 7A, an enlarged elevated view of a microlasing cylindrical bead structure 20 is shown. The microlasing cylindrical bead structure 20 comprises cylindrical dielectric sheets that are equivalent to a closed two-dimensional slab waveguide and supports a resonant mode. Modes with Q values exceeding $10^6$ are possible with active layer thicknesses of about 1–2 $\mu$m and diameters (D) of about 5–50 $\mu$m. FIG. 7B illustrates an enlarged cross-sectional view of the microlasing cylindrical bead structure 20 of FIG. 7A. The core region 22 is surrounded by a gain medium layer or region 24 and a isolation layer or region 26. The gain medium layer 24 has a higher index of refraction than the core region 22 and the isolation layer 26. A plurality of gain medium layers and a plurality of isolation layers surround the core region 22. The core region 22 may be metallic, polymeric or scattering. The gain medium layer 24 is preferably one of a plurality of optical gain medium films that are disposed about the core 22 for providing a plurality of characteristic emission wavelengths.

As has been made apparent above with a number of exemplary embodiments, an optical gain medium capable of emitting a laser-like or a secondary emission may be employed to identify articles. Such articles may be, but are limited to, linens, or garments, or various types of textiles generally.

As is described below, it is an aspect of the present invention to provide an identification (and possible sortation) system which includes an acquisition system, a pointing system, an excitation system and a detection system. In accordance with this aspect of the present invention, the identification system permits photonically active materials disposed on an article under evaluation to be located (i.e. acquired), an excitation source to be pointed at the acquired materials, an excitation emission to be directed thereon, and an optical response (laser-like emission or secondary emission) to the excitation emission from the materials to be detected. In this way, a "search, point, shoot and detect" system enables the identification of articles during processing operations.

It should be noted that having identified an article that it may be desirable to subsequently sort or segregate the identified article from other articles. In this case any suitable type of diverter, manipulator, or sorter apparatus can be coupled to the identification system for affecting further processing of identified (or of non-identified) articles. However, the practice of this invention does not require that sorting be performed, or that identified objects be segregated in any way one from another or from other objects.

Figure 8:
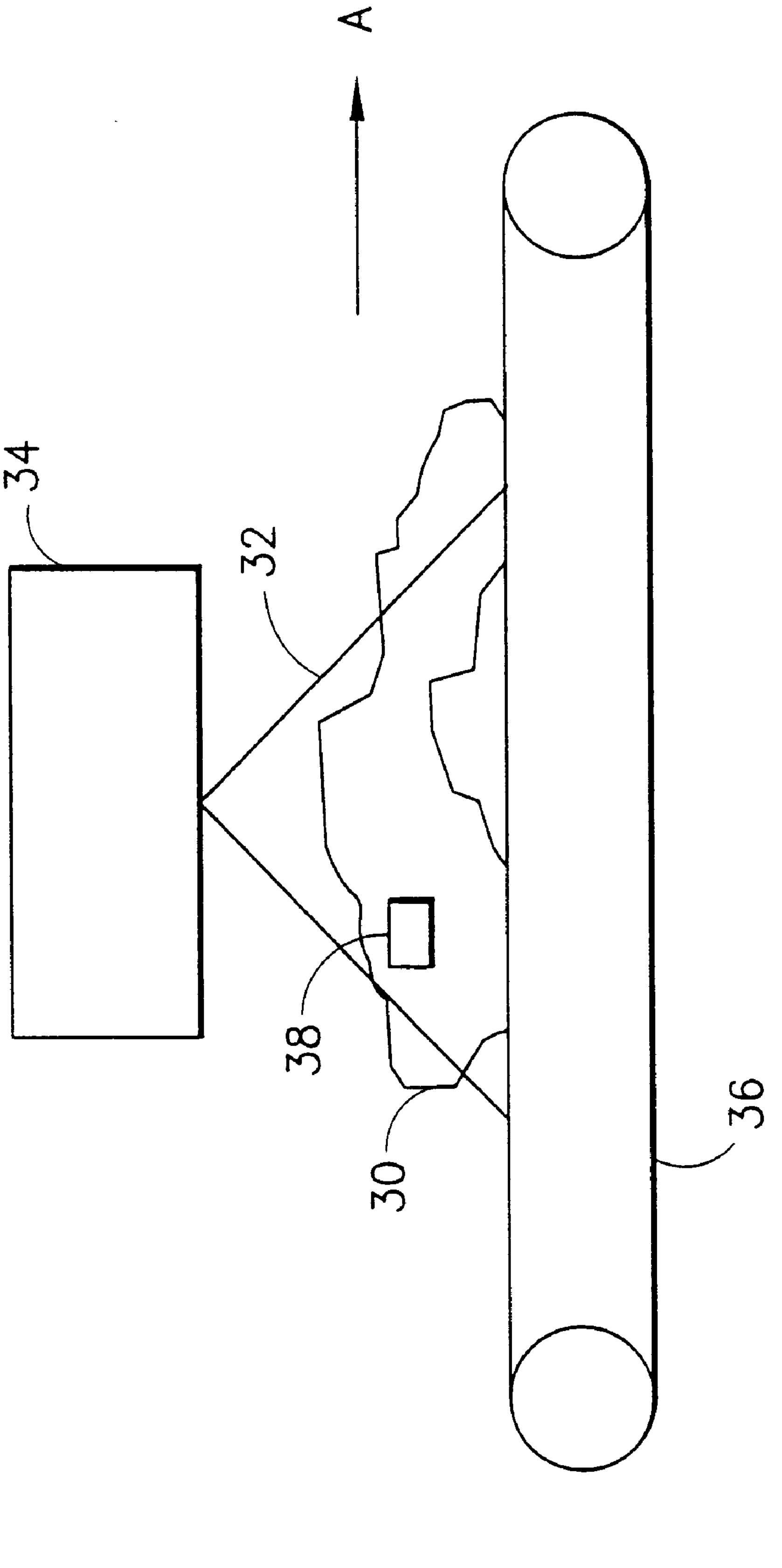
FIG. 8 is a diagram of an exemplary identification system operating in accordance with the present invention.
Figure 9:
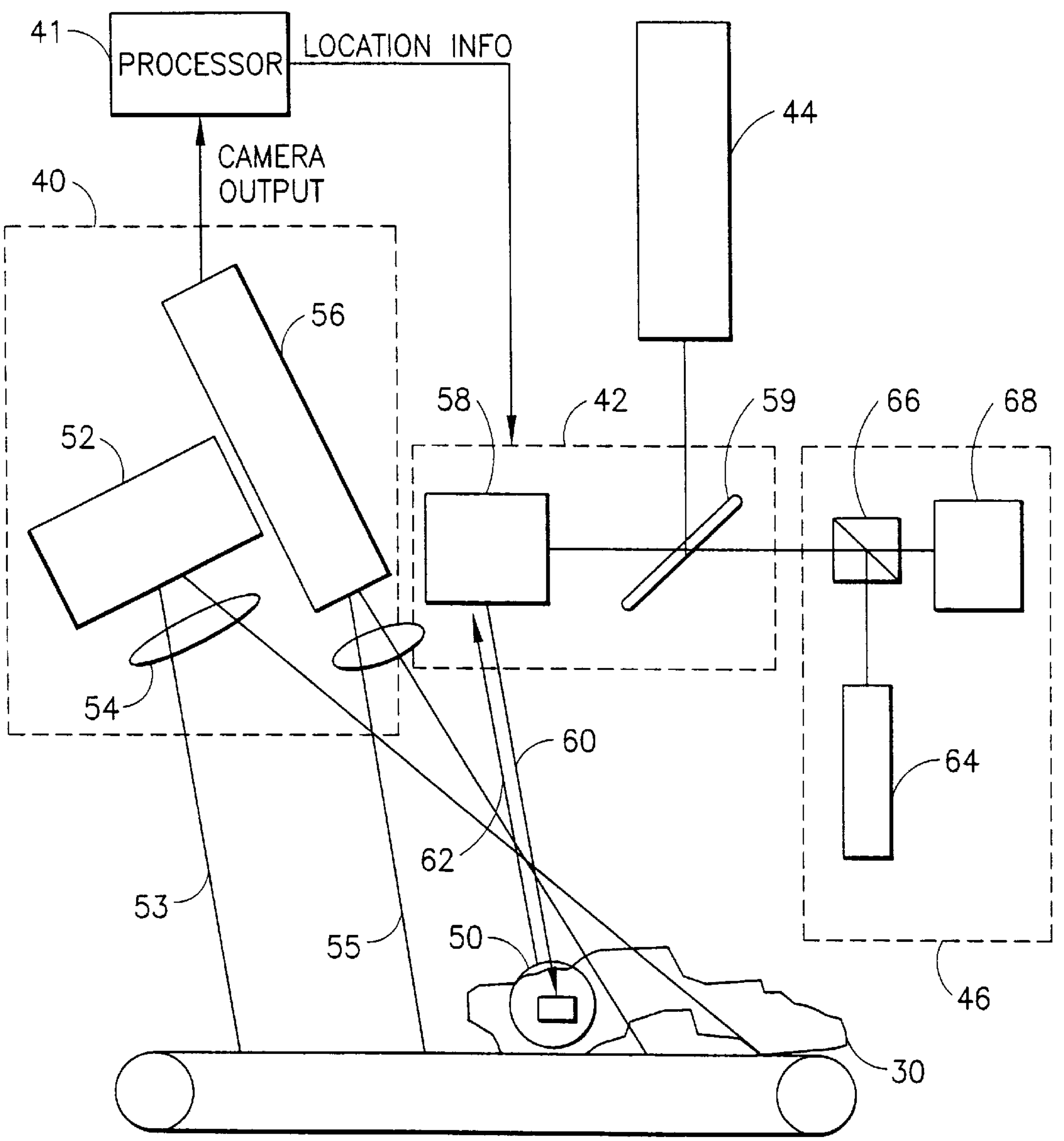
FIG. 9 is a more detailed block diagram of a self-targeting reader of the identification system shown in FIG. 8.

FIGS. 8 and 9 illustrate an exemplary embodiment of a self-targeting reader system for remote identification of articles, i.e. the "search, point, shoot and detect" system discussed above. As shown in FIG. 8, articles 30 such as, for example, garments, linens, textiles and other coded materials, are identified as they pass through a field of acquisition 32 of a remote identification device 34. In one embodiment of this invention, a number of articles 30 may be automatically passed through the field of acquisition 32, in the direction indicated by arrow "A", by a conveyance such as, for example, a moving rail or a conveyor 36.

In accordance with the present invention, the articles 30 include at least one region 38 containing photonically active materials. As noted above, the photonically active materials permit an optical encoding of the articles 30 for purposes of, for example, identifying and optionally sorting the articles 30 during processing operations. By example, the at least one region 38 may be a label sewn, glued, or otherwise affixed or bonded, to the article 30. As can be appreciated from the various embodiments outlined above, the optical coding and identification of the articles 30 may be performed by detecting a unique laser-like or secondary emission from the at least one region 38 in response to an excitation.

FIG. 9 shows a schematic diagram of the self-targeting reader system of FIG. 8. In FIG. 9, four functional aspects of the reader system are particularly emphasized. These four functional aspects include devices for performing target acquisition 40, pointing 42, excitation 44 and receiving or detection 46, i.e. the "search, point, shoot and detect" properties of the self-targeting reader system 34.

Target acquisition utilizes a luminous property of photonically active material attached to the article 30 under evaluation to locate a brightest or strongest emitting area of the article 30. That is, an area 50 of the article 30 that, in response to an excitation, emits a luminous or fluorescent emission within one or more specific ranges of wavelengths.

In FIG. 9, a suitable stimulus source 52 may employ a lens 54 or some other means to produce a preferably divergent beam pattern 53 which illuminates the field of acquisition of the reader system 34. As a result, the photonically active material attached to the article 30 passing through the field is excited by the emission from the stimulus source 52. As noted above, in response to the excitation the photonically active material emits the luminous or fluorescent emission within a specific range of wavelengths. As can be appreciated, suitable stimulus sources 52 are selected according to the application and properties of the fluorescent materials incorporated within the articles under evaluation. It is desirable that the beam 53 be wide enough to insure a detection of the photonically active material for whatever orientation it may assume.

Suitable examples of the stimulus source 52 may include, for example, X-ray sources, Xenon flashlamps, fluorescent lamps, incandescent lamps and a widely divergent laser beam. In one embodiment, the suitable stimulus source 52 may be produced by modification of the excitation device 44.

Referring in this regard to FIG. 1, during an excitation mode the emission from the excitation laser source 1 propagates along a beam path 7 toward the pointing system. During the acquisition mode, a stimulus source is created from the excitation by redirecting the excitation source emission along beam path 8 by the introduction of a movable mirror 5. Mirror 5 is caused to interrupt beam path 7 by an actuator 2 that has a rotating shaft 3 onto which the mirror 5 is held by an actuating arm 4. The actuator 2 can be a solenoid, a galvanometer, or any other device that can cause the mirror 5 to be positioned in and out of the beam path 7, preferably by an electrical command from the reader control electronics. After the beam is deflected along beam path 8, it is directed to the input face 11 of a mode scrambling crystal 10. Depending on the specific design requirements, the beam may be directed onto the crystal face 11 by reflection from a mirror 6, and may require focusing through a lens 9 to cause all of the beam to enter the crystal face 11. The mode scrambling crystal 10 is a light pipe that preferably has a cross sectional shape the same as the shape of the acquisition field of view (i.e., if the field of view is designed to be square, then the crystal cross section is square as well). In the preferred embodiment, all sides of the crystal are polished so that light propagating inside the crystal is reflected upon incidence with a side by total internal reflection. Alternatively, the sides of the crystal 10 could be caused to have a high reflection coefficient by coating the sides with a metallic or dielectric coating. The input face 11 is ground using a micro grit such that light entering the input face is scattered into randomized directions inside the crystal 10. This scrambling of the wavefront causes light to uniformly fill the volume of the crystal 10 after multiple internal reflections off the sides of the crystal. Upon reaching the output face of the crystal 10, the light distribution is uniform across the output face and has the shape of the cross section of the crystal. The light also exits the crystal 10 through a wide and randomized range of angles, the maximum of which is determined by the refractive index of the crystal and of the surrounding medium (usually air). The light exiting the crystal 10 is collected and imaged by a lens 12 onto a target area of the acquisition system 14. The imaging lens 12 is chosen to cause the imaged rays 13 from the crystal 10 to substantially fill the target area.

The normal mode of operation of the reader system is as follows. First the mirror 5 is positioned into the beam path 8. When an article is sensed in the acquisition field of view the excitation source is triggered causing a uniform illumination to envelope the target area and thus the article. The uniform illumination causes coded materials on the article to fluoresce and be sensed by the acquisition camera. The mirror 5 is removed from the beam path 8, and the pointing system is commanded to point in the direction of the brightest detected fluorescence. When the article is sensed in the target area of the pointing system the excitation source is again triggered to cause a targeted narrow beam of excitation to impinge on the coded material. After the coded emission is detected and analyzed, mirror 5 is again positioned into the beam path 8 and the cycle is ready to repeat.

In general, a suitable stimulus source 52 should be understood to be an electromagnetic radiant source whose emission is absorbed by the photonically active material and which has sufficient photonic energy to induce a detectable fluorescence in the photonically active material. By example, in an embodiment wherein the above-identified LaserThread™ are incorporated in the article 30 under evaluation, a Xenon flashlamp having an emission spectrally narrowed by a filter is a suitable stimulus source 52, since LaserThread™ can be caused to fluoresce upon absorption of visible radiation from the Xenon flashlamp. In another embodiment where the article 30 is self-emissive at a location where the photonically active material is incorporated, a stimulus source 52 is not required. Such self-emissive articles include, for example, bioluminescent and chemiluminescent articles.

The luminous or fluorescent emissions from the photonically active material, either induced or intrinsic, are detected by, for example, an imaging electronic camera system 56 of the target acquisition system 40. A field of view of the camera system 56 is preferably coincident with or smaller than the divergent beam pattern 53 of the stimulus source 52. In essence, the field of view 55 of the camera system 56 defines the field of acquisition 32 of the reader system 34.

In one embodiment, fluorescent emissions from the photonically active material pass through a filter which substantially passes the fluorescent emission but which attenuates strongly diffuse scattered or specularly reflected stimulus emissions from the article 30. By locating appropriate filters, i.e. filters that possess non-coincident passbands, within a path of the stimulus source 52 and the camera 56, the primary emissions from the stimulus source 52, after impinging the article 30, are not detected by the camera 56. Electronic signals from the imaging camera system 56 may be analyzed by a computer or dedicated image processing electronics 41 to determine the location, within the field of view 55, of the strongest emitting area 50 of the article 30. Conventional image acquisition and processing software can be used for this purpose.

It should be appreciated that in applications in which only a single fluorescent section of the article 30 can be present at a time within the field of acquisition 32, other imaging detectors such as, for example, Position Sensing Detectors can be used instead of the imaging camera system 56.

Information which specifies the location within the field of view of the strongest emitting area 50 of the article 30 is passed from the target acquisition system 40, i.e. the camera system 56 or the processing electronics 41, to a beam pointing system 42. The beam pointing system 42 processes the location information and, in response thereto, aligns or directs emissions 60 from the excitation device 44 to impinge the article 30 substantially on the strongest emitting area 50.

It should be appreciated that, in accordance with the present invention, the pointing system 42 includes an agile beam steering device 58 which is responsive to the location information (e.g., electronic control signals) from the target acquisition system 40. It should also be appreciated that the pointing system 42 may include acousto-optic beam detectors, rotating polygonal mirrors, lens (microlens array) translators, resonant galvanometer scanners and holographic scanners, or any combination thereof.

In one embodiment of the pointing system 42, a two-axis beam steering pointing system is comprised of two non-resonant galvanometer scanners that each have a mirror attached to the scanner shaft. One scanner causes beam deflection along one axis and redirects emissions from an excitation source onto the second scanner mirror. A rotation axis of the second scanner is orthogonally oriented with respect to the first scanner axis so that the excitation emission is redirected toward the article and is scannable in two independent axes to substantially cover the entire acquisition field of the acquisition system 40. Mirror reflection characteristics are specified to allow high throughput for the excitation system while also allowing high throughput for the secondary emission or lasing emission from the photonically active material attached to the article 30. Preferably, the mirrors possesses a high energy-density damage threshold at the excitation wavelength.

The pointing system 42 also includes a diplexer 59 for combining the emissions 60 from the excitation source 44 propagation toward the article 30 with a secondary emission or a laser-like emission 62 from the photonic material, which is propagating toward the receiving device 46.

Figure 2:
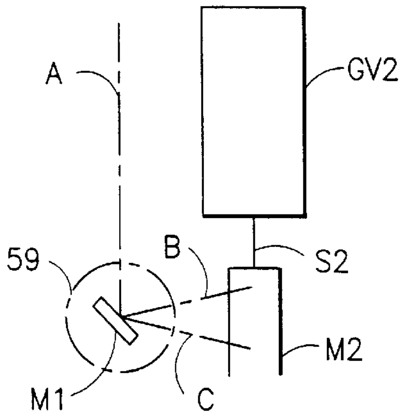
FIG. 2 is a top view of a beam pointing system in accordance with this invention.
Figure 3:
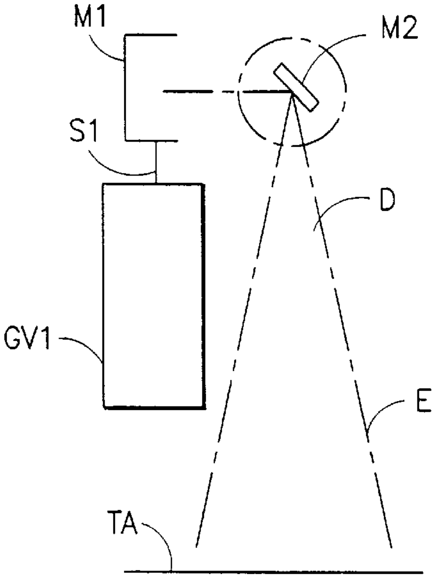
FIG. 3 is a side view of the beam pointing system of FIG. 2.

FIG. 2 is a top view of the pointing system and FIG. 3 is a side view. Beam path A originates at the diplexer 59 and includes the excitation beam counterpropagating received light form the coded article. The beam A reflects from first mirror M1 to form beam B, or if the mirror Ml has rotated, to form beam C. Mirror M1 is mounted onto the shaft S1 of first galvanometer GV1. The axis of shaft S1 is typically mounted orthogonally with respect to beam path A. GV1 causes mirror M1 to rotate in response to electrical signals from the reader control electronics. Beam B or C reflects from second mirror M2 to form beam D, or if mirror M2 has rotated to form beam E. Mirror M2 is mounted onto the shaft S2 of second galvanometer GV2, where the axis of S2 is orthogonally oriented with respect to S1, and typically lies in a plane containing beam A. GV2 causes mirror M2 to rotate in response to electrical signals from the reader control electronics. Mirror M1 causes the beam A to move along a line projected onto the plane of the target area that is parallel to original beam path. Mirror M2 causes beam A to move in a line projected onto the plane of the target area that is orthogonal to the original beam, and typically parallel to beam B. In this way, actuation of mirrors M1 and M2 cause the beam A to be deflected to a commanded spot within the target area TA.

The diplexer 59 may be realized as a number of conventional devices that utilize any one of three properties of photons to permit collinear counterpropagation of a light beam. The three properties are polarization, wavelength and momentum. As a result, the diplexer 59 may be embodied as a polarizing beam splitter (when polarization is utilized), a dichroic mirror (when wavelength is utilized), and a free-space non-reciprocal element referred to in the art as a circulator (when momentum is utilized). Another suitable embodiment is a partially reflecting mirror, known also as a beam splitter, which can be employed when the losses associated with this device can be tolerated in the overall system design.

An element 66 of the receiving system 46 is a functional equivalent of the diplexer 59 but, typically, is configured as another one of the three devices described above. In one embodiment, for example, the diplexer 59 is a dichroic mirror and the element 66 is a polarizing beam splitter. In effect, the element 66 serves to add an output of a coherent or calibration source 64 to the collinear beam passed from the pointing device 42 to the receiving device 46. The addition of the output of the coherent source 64 is performed during a calibration operating mode of the reader system 34.

During the calibration operating mode, the output of the coherent source 64 is added to the collinear beam to permit the calibration of the directed position determined by the pointing system 42 to the strongest emitting area 50 detected by the acquisition device 40. In one embodiment, the coherent source 64 is comprised of, for example, a laser diode, a Helium-Neon laser or another suitable source emitting radiation detectable by the camera system 56 of the acquisition device 40.

In a preferred calibration process, a flat target is placed in the field of view 55 of the camera system 56 during a calibration operation so that a portion of light from the coherent source 64 propagating collinearly with the excitation source light 60 and the received light 62 is scattered from the flat target into the camera system 56. A data table is generated and stored in the computer or dedicated image processing electronics 41 of the acquisition system 40. Entries in the data table link a unique detected strongest emitting area 50 of the article 30 and a unique directed position of the pointing system 42. During a normal operating mode of the reader system 34, i.e. when the calibration mode and, thus, the coherent source 64 is off, the data table is used to aid the determination of an appropriate position for the pointing system 42 to direct the excitation source emission 60. That is, by comparing a position of a detected strongest emitting area 50 within the acquisition field to corresponding entries within the data table an associated directed position for the pointing system 42 is determined.

Figure 4:
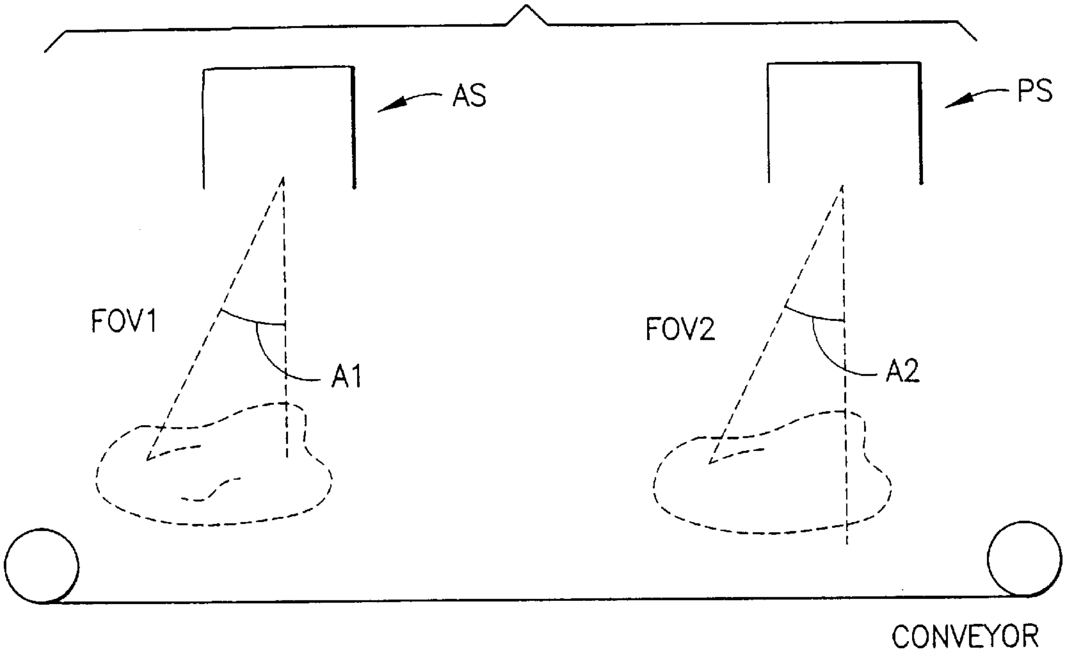
FIGS. 4 and 5 are useful in explaining a calibration technique in accordance with this invention.

Discussing calibration now in further detail, FIG. 4 shows a more detailed side view of the invention. In this figure the acquisition system (AS) (and associated field of view (FOV1)) and pointing system (PS) (with its associated field of view (FOV2)) are shown to be well separated for clarity. In the preferred embodiment, the two fields of view are desired to be as overlapped as much as possible to minimize targeting errors arising from undesired motion of the article on the conveyance that may occur during the time between acquiring and exciting. The detected position of the brightest fluorescence by the acquisition system imaging camera corresponds to two orthogonal angles in the camera field of view. If an imaginary line is drawn to connect the camera and the fluorescence area, then this line can be described by the angles it forms with respect to the central axis of the camera. One of these angles A1 is in a plane which contains the velocity vector of the article and the camera, i.e., in the plane of the figure. The other angle is in a plane orthogonal to the first, and contains a line across the width of the conveyor and the camera, i.e., a vertical plane projecting perpendicularly out of the page. Similar angles (e.g., A2) can be drawn from the article's position within the pointing system's field of view. If these angles are not identical in the fields of view (i.e. A1=A2), then parallax errors could cause the pointing system PS to point to the wrong area. Preserving these angles is thus an important aspect of the invention. This is especially important because articles on a conveyor do not necessarily lie in the plane of the conveyor belt. In fact, they are more likely to have a three dimensional characteristic after having formed a pile.

Figure 5:
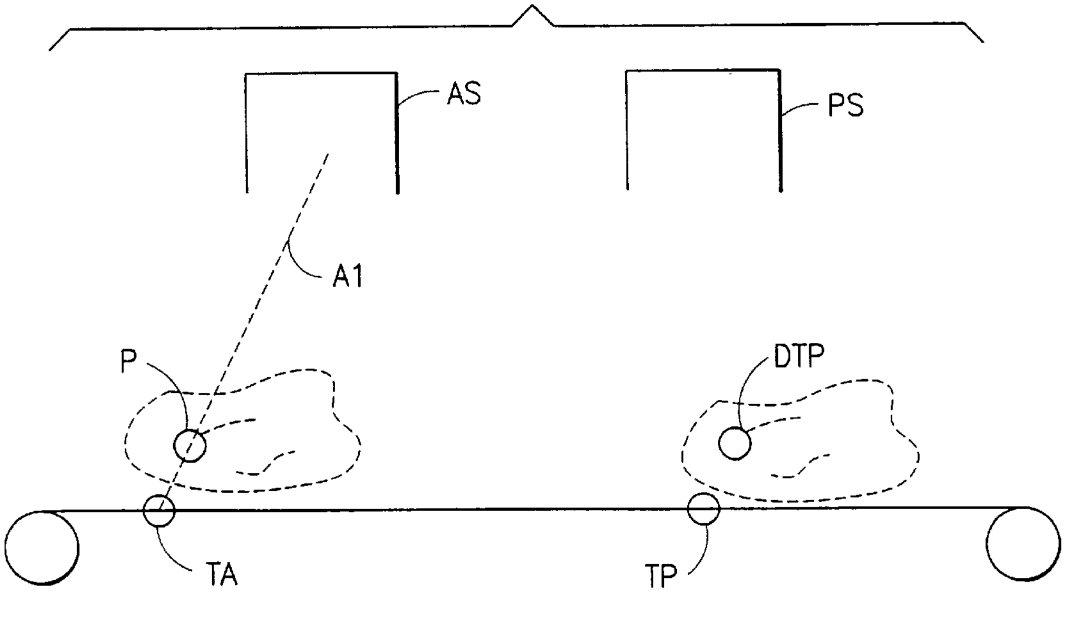

FIG. 5 shows how parallax can cause pointing errors if the angles in the fields of view are not preserved.

In FIG. 5, the acquisition system (AS) locates the area of greatest fluorescence F and maps this area to a point (P) in the plane of the target area TA. For flat articles, point F coincides with point TA. The pointing system of this embodiment does not possess a scanning mirror for pointing the excitation emission in the plane of the Figure. Instead, this system waits for the article to move under the pointing system until the target point TP is directly underneath. Now, while target point TP is identical to the point in the plane of the target area TA, the emission misses the desired target point DTP on the article. This is because the target angle Al measured by the acquisition system is not preserved by the pointing system, and a parallax error has occurred.

In one embodiment, however, where the articles are known to lie flat on the conveyor, this type of system configuration points to the desired point with the benefit of using one less scanning mirror.

Figure 6A:
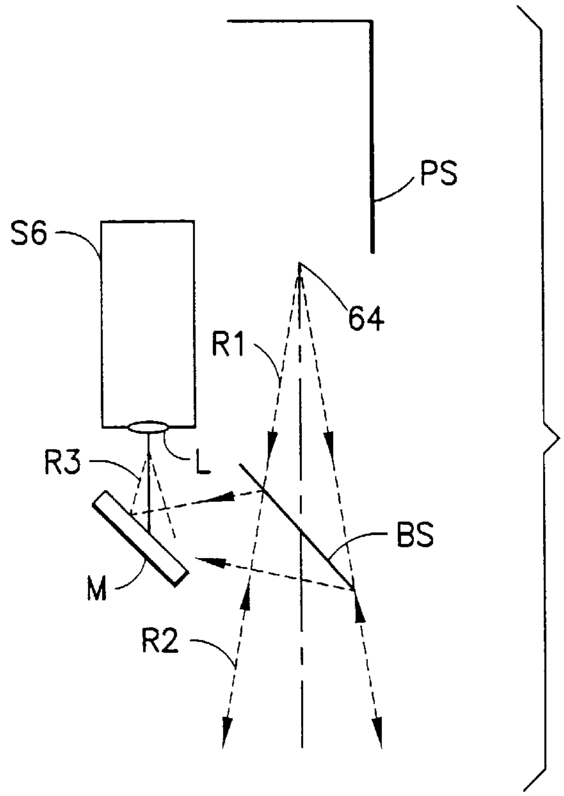
FIG. 6A is a diagram of calibration-related equipment used to cause the optical axes of the acquisition and the pointing systems to be coincident.

It should now be clear that a calibration procedure should be performed for the acquisition angle Al to agree with the pointing angle A2 in FIG. 4, since the angle corresponding to the area of greatest fluorescence is used to command the pointing mirrors of the pointing system to reproduce the pointing angles precisely. The calibration procedure employs an additional apparatus during the calibration procedure that causes the optical axes of the acquisition system and pointing system to be coincident. FIG. 6A shows a preferred embodiment.

The calibration apparatus of FIG. 6A includes a partially reflecting beamsplitter BS (also known as a pellicle beamsplitter), a mirror M, and a fixture for holding the acquisition camera 56 and pointing system PS in precise alignment with the mirror M and beamsplitter BS. The apparatus functions by causing the rotation axis of the pointing system PS to be precisely coincident with the pupil of the camera lens (L). With this alignment, an arbitrary ray R1 from the pointing system propagates to the target area as ray R2, is reflected in the target area back along the path R2 and into the camera 56 as ray R3. Ray R3 has the same angle with respect to the optical axis of the camera 56 as ray R1 has with respect to the optical axis of the pointing system. Ray R1 is derived from the coherent source in the receiver (calibration source 64 in FIG. 9).

During the calibration procedure a command signal is supplied to the pointing mirrors to point the coherent source in a direction of, for example, ray R1, and the coherent source light scattered from the target area is detected by the camera 56 as ray R3. There is now a mapping of the command signal to the pointing mirrors and a detected position in the acquisition camera 56. A table is constructed so as to contain all possible combinations of command signals to the mirrors, and the corresponding detected position in the camera 56. After this calibration procedure is completed, the calibration table is used in reverse, such that now a detected position in the camera 56 can be used to define a unique command signal to the mirrors, which reproduces precisely the same field angle.

Table 1 of FIG. 6B shows a subset of an exemplary calibration table constructed during the calibration procedure. The values Vx and Vy are voltages sent to the pointing mirrors, and the entries in the table at the intersection of voltage values are the x and y pixel values of the camera that detected the reflected source light. Table 2 of FIG. 6C is derived from Table 1, and is used during the normal mode of operation. When a bright fluorescent area is detected, the x and y pixel values for the pixel that detected the fluorescence are used to determine Vx and Vy command voltages to the pointing mirrors.

As noted above, the excitation of the photonically active material, for example, LaserThread™, is provided by the excitation source 44. The specifications for suitable excitation sources 44, therefore, are determined by the requirements of the photonically active material of the articles 30 of interest. By example, the LaserThread™ are excited to lase when exposed to the output of a laser having specific characteristics of wavelength, pulse energy and pulse duration. Generally, the required excitation laser has a wavelength in the red to blue region of the visible spectrum and can provide radiant energy densities on the order of, for example, about 10 milliJoules per square centimeter when an about 10 nanosecond pulse is directed at the LaserThread™. Exemplary excitation sources include, for example, flashlamp-pumped, Q-switched, frequency doubled Nd:YAG lasers, diode-pumped, Q-switched, frequency-doubled Nd:YAG lasers, and sources derived from other nonlinear devices involving principally Nd:YAG lasers or other laser crystals. To increase system tolerance to pointing errors (i.e. misdirection of the excitation source 44) and variations in article movement through the field of view 55 of the acquisition system 40, the excitation beam 60 is preferably made to be divergent such that it illuminates a spot on the article that is larger than the reader's imaging and pointing resolutions.

In accordance with an embodiment of this invention, the photonically active material is excited by the excitation source 44 to fluoresce to provide optical coding, and the source 44 may be other than a laser source. In this case the source is selected to produce in the detector a high signal to noise ratio signal that is adequate for spectral analysis. For example, the source could comprise a spectrally filtered and substantially collimated Xenon flashlamp.

As noted above, the pointing system 42 collects and directs the secondary or lasing emission 62 from the photonically active material into the receiving system 46 via the beamsteering device 58 and the diplexer 59. In one embodiment, the receiving system 46 includes a dispersive element for spectrally analyzing the received emission. For example, the receiving system 46 can couple received emissions into an optical fiber which is coupled to a grating spectrometer and multi-channel detector element such as, for example, a CCD array. Alternatively, the receiving system 46 includes an imaging spectrometer for spectrally analyzing emissions in one axis, and spatially imaging the emissions along an orthogonal axis. A computer or dedicated electronic processor can then analyze the spectral and/or spatial signature of the emissions to output an indication of an identity of an article under evaluation.

As can be appreciated, a finite amount of time is required to acquire a field of data from the camera system 56 and to process that data in the acquisition system 40 in order to locate a brightest fluorescent area 50 of the article 30. During this time the article 30 may be traveling through the field of acquisition 32 of the reader system 34. Unless the displacement of the article as a result of this traveling is accounted for the pointing system 42 will direct the emission from the excitation source 44 to an incorrect location, i.e. a location where the brightest fluorescent area 50 of the article 30 was previously detected. Therefore, it is within the scope of the present invention to account for the displacement of the article 30 during examination. For example, in one embodiment the acquisition system 40 is physically separated from the other systems of the reader system 34 by a distance at least as large as would be necessary to account for the time to acquire and process the location of the brightest fluorescent area 50, plus any settling time needed for mechanical elements of the pointing system 42 to direct the emission 60 from the excitation source 44. As can be appreciated, this time period will vary by specific implementation factors such as, for example, the velocity of the conveyance device 36 which moves the article 30 through the field of acquisition 32.

In an exemplary embodiment, the acquisition 40 and pointing 42 systems are activated by a first sensor located to detect the article's movement through the acquisition field 32, while the excitation 44 and receiving 46 systems are activated by a second sensor. In accordance with this embodiment of the present invention, the location of the first and the second sensors are adjusted to minimize and substantially remove errors resulting from the movement of the article 30.

In one embodiment, the reader system 34 identifies a plurality of articles within a stationary acquisition field. In this embodiment, the articles which each are smaller in size than the acquisition field and may be scattered randomly in the acquisition field or, alternatively, separated in an orderly way such that adjacent articles are not in contact. An ordered separation of articles may be achieved by, for example, utilizing a segmented tray. All articles within the acquisition field can be illuminated with a single pulse from a stimulus source, for example, the stimulus source 52. The single pulse of sufficient energy to excite fluorescence in all the articles within the acquisition field. It can be appreciated, as noted above, that the articles can also be self-fluorescent.

In this embodiment, a target acquisition algorithm identifies all detectable luminous emissions from the articles that exceed a predetermined threshold brightness value. Target locations detected by the acquisition system may then be serially passed to the pointing, excitation and receiving systems to identify and to optionally permit sorting of the articles within the acquisition field.

In a preferred embodiment the pointing system directs emissions from the excitation system and the response from the photonically active material to the receiving system. However, it should be appreciated by one of skill in the art that other embodiments are also within the scope of the present invention. For example, one embodiment may have only the excitation system directed through the pointing system while the receiving system views the entire acquisition field separately to collect the response of the photonically active material, or vice versa. In another embodiment, the acquisition, the excitation and the receiving systems may each be directed through the pointing system.

Although described in the context of preferred embodiments, it should be realized that a number of modifications to these teachings may occur to one skilled in the art. By example, the teachings of this invention are not intended to be limited to the identification and optional sorting of any specific type of article. As such, those skilled in the art will recognize that the teachings of this invention can be employed in a large number of identification applications.

It may be desirable to use the reader system of this invention with a broad range of coded materials such that one excitation source wavelength is insufficient to provide adequate excitation for all of the materials. In this case, the excitation source could be adapted to include multiple wavelengths. In one embodiment, a second wavelength is generated from the first wavelength through a nonlinear optical process (for example, through Stokes shifting), and the two wavelengths are made to be collinear using one of the previously described diplexer devices. The two beams are preferably collinear so as to pass through the pointing system.

Furthermore, it may desirable to detect properties of the article other than the coded material. For example, the color of the article onto which the coded material is applied may be useful to determine. In this embodiment, other properties of the article could be determined by incorporating other suitable detectors into the receiver of the reader, in addition to the spectrometer of the preferred embodiment. The optical axis of this additional detector(s) may be brought into collinearity with the optical axis of the receiver by a diplexer element. It may be desirable to make the field of view of the additional detector(s) substantially broader than the field of view of the spectrometer so that these other properties of the article are measured at locations near the location of the coded material.

The reader device of the preferred embodiment of this invention has capabilities of acquiring targets in a two-dimensional field of view (by an area camera) and exciting/detecting targets in a two-dimensional field of view (by a two-dimensional pointing system). However, other embodiments can be provided by considering acquiring capabilities restricted to one dimension (by a line-scan camera), or point detection (single element, non-imaging detector), and by considering pointing system capabilities restricted to one dimension (single axis scanner), or point excitation/spectral detection (no scanner). Various permutations are also possible. A reader system of the former type (single axis scanning) is particularly applicable when the articles have the coded material applied at a known location on the article along the dimension parallel to the direction of travel along the conveyance. In this case, the motion of the conveyor can be used to replace the scanner function. This configuration is subject to parallax errors (as shown in FIG. 5) and is most applicable when the articles lie in the plane of the conveyance. This approach also employs a stimulus source capable of providing continuous output, or at least at a repetition rate that, together with the conveyance velocity, provides adequate spatial resolution along the direction of travel. A reader system of the latter type (no scanning) may be applicable when the coded material location on the article is known along both axes of the article. In a manner similar to the previous case, the reader system uses the motion of the article by the conveyance to provide the scanning function.

Another embodiment of the invention applies to a case where the code on the article is distributed in several separate locations, and where the separation distance is greater than the spatial resolution of the pointing system. For example, the optical code may require a plurality of wavelengths and thus a plurality of coding materials that cannot be readily collocated. In this case, the acquisition system identifies the locations on the article of each of the component materials. The reader system then sequentially points, excites, and detects the optical wavelength from each of the materials on the article, subsequently "building" the code by an appropriate combination or concatenation of the individual wavelengths detected.

Thus, it can be appreciated that while the invention has been particularly shown and described with respect to preferred embodiments thereof, it will be understood by those skilled in the art that changes in form and details may be made therein without departing from the scope and spirit of the invention.

What is claimed is:

1. A method for identifying articles, comprising steps of:

providing a plurality of articles, each of the articles having at least one portion that includes a photonically active material;

for each article, illuminating the at least one portion with light from a stimulus source;

identifying a location of the at least one portion that includes the photonically active material by detecting an emission from the photonically active material;

pointing an excitation source at the identified location;

illuminating the at least one portion within the identified location with light from the excitation source; and detecting an identification-encoded emission from the photonically active material in response to the light from the excitation source.

2. A method as set forth in claim 1, wherein the photonically active material is comprised of threads comprising a substrate material and an electromagnetic radiation emitting and amplifying material for providing a laser-like emission.

3. A method as set forth in claim 2, wherein the threads are stitched to the article.

4. A method as set forth in claim 2, wherein a patch is comprised of the threads, and wherein the patch is affixed to the article.

5. A method as set forth in claim 1, wherein the photonically active material is comprised of bead structures for providing an emission having characteristics similar to laser emission characteristics.

6. A method as set forth in claim 1, wherein the stimulus source is comprised of an electromagnetic source whose emission is absorbed by the photonically active material and which has sufficient energy to induce a detectable emission from the photonically active material.

7. A method as set forth in claim 1, wherein when excited by the light from the excitation source the photonically active material outputs a secondary emission that is substantially brighter than when excited by light from the stimulus source, such that a high signal-to-noise ratio spectral analysis of the identification-encoded emission is achieved.

8. A method as set forth in claim 1, and further comprising a step of sorting articles based on the detected identification-encoded emission.

9. A method as set forth in claim 1, wherein the detected identification-encoded emission is comprised of an optical code for identifying at least one characteristic of the article.

10. A method for identifying articles, comprising steps of:

providing a plurality of articles, each of the articles having at least one portion that includes a photonically active material;

for each article, illuminating the at least one portion with light from a stimulus source;

identifying a location of the at least one portion by detecting an emission from the photonically active material;

pointing an excitation source at the identified location;

illuminating the at least one portion within the identified location with light from the excitation source; and detecting an identification-encoded emission from the photonically active material in response to the light from the excitation source, wherein the method further comprises initial calibration steps of:

providing a calibration source for generating light;

co-propagating a portion of the light from the calibration source with a portion of the light from the excitation source and the response from the photonically active material to the light from the excitation source; and constructing a calibration table for associating excitation source pointing directions with directions from which an emission is received in response to the light from the stimulus source.

11. A method for identifying articles, comprising steps of:

providing a plurality of self-emissive articles, each of the self-emissive articles having at least one portion that includes a photonically active material;

for each article, identifying a location of the at least one portion that includes the photonically active material by detecting an emission from the self-emissive article;

pointing an excitation source at the identified location;

illuminating the at least one portion within the identified location with light from the excitation source;

detecting an identification-encoded emission from the photonically active material in response to the light from the excitation source; and identifying an individual one of the articles based on the detected identification-encoded emission.

12. A method as set forth in claim 11, wherein the self-emissive articles are comprised of one of bioluminescent and chemiluminescent articles.

13. An apparatus for identifying articles, comprising:

a stimulus source generating light for illuminating at least one portion of each of said articles, said at least one portion comprising a photonically active material;

a first detector for identifying a location of said at least one portion that comprises said photonically active material by detecting an emission from said photonically active material in response to said light from said stimulus source;

an excitation source for generating light;

a pointing system for pointing said excitation source at said identified location such that said light from said excitation source illuminates said at least one portion within said identified location; and a second detector for detecting an information-encoded emission from said photonically active material in response to said light from the excitation source.

14. An apparatus as set forth in claim 13, wherein said stimulus source is comprised of a radiant source whose emission is absorbed by said photonically active material and which has sufficient energy to induce a detectable secondary emission from said photonically active material.

15. An apparatus as set forth in claim 13, wherein said first detector is comprised of an electronic camera.

16. An apparatus as set forth in claim 13, wherein said excitation source is comprised of a laser.

17. An apparatus as set forth in claim 13, wherein said excitation source is comprised of one of a flashlamp-pumped, Q-switched frequency doubled Nd:YAG laser, a diode-pumped, Q-switched frequency doubled Nd:YAG laser, and devices derived from nonlinear devices which include Nd:YAG lasers and other laser crystals.

18. An apparatus as set forth in claim 13, wherein said means for pointing is comprised of a beamsteering device having at least one degree of freedom.

19. An apparatus as set forth in claim 13, and further comprising a conveyor for moving said articles through a field of view of said apparatus.

20. An apparatus as set forth in claim 13, and further comprising a calibration subsystem for associating an output of said first detector with a controlling input of said pointing system.

21. A method for determining information about an object, comprising steps of:

providing an object so as to have at least one portion comprised of a photonically active material;

illuminating the at least one portion with stimulus light;

detecting a first emission from the photonically active material in response to the stimulus light;

identifying a location of the at least one portion using the detected first emission;

pointing a beam of excitation light at the identified location;

illuminating the at least one portion within the identified location with the excitation light;

detecting a second emission from the photonically active material in response to the excitation light; and decoding the second emission to obtain information that is descriptive of at least one characteristic of the object.

22. A method as in claim 21, wherein the steps of illuminating use two separate light sources.

23. A method as in claim 22, wherein one of the light sources is comprised of a lamp, and wherein another one of the sources is comprised of a laser.

24. A method as in claim 22, wherein both of the light sources are comprised of a lamp.

25. A method as in claim 22, wherein both of the light sources are comprised of a laser.

26. A method as in claim 21, wherein the steps of illuminating use the same light source.

27. A method as in claim 26, wherein the light source is comprised of a lamp.

28. A method as in claim 26, wherein the light source is comprised of a laser.

29. A method as in claim 21, wherein the step of illuminating the at least one portion with stimulus light comprises a step of operating one of an X-ray source, a flashlamp, a fluorescent lamp, an incandescent lamp or a laser.

30. A method as in claim 21, wherein the step of illuminating the at least one portion within the identified location with excitation light comprises a step of operating a Xenon flashlamp.

31. A method as in claim 21, wherein the step of illuminating the at least one portion within the identified location with excitation light comprises a step of generating a plurality of wavelengths of light.

32. A method as in claim 31, wherein the step of generating includes steps of generating first excitation light having a first wavelength; and generating further excitation light, having a second wavelength, from the first excitation light.

33. A method as in claim 21, wherein the step of detecting the first emission uses an imager having a two-dimensional field of view; and wherein the step of pointing the beam of excitation light uses a pointing system that operates in two-dimensions.

34. A method as in claim 21, wherein the step of providing the object includes a step of moving the object, wherein the step of pointing the beam of excitation light points the beam along one axis.

35. A method as in claim 21, wherein the step of detecting the first emission uses one of a position sensing detector or an imaging camera system.

36. A method as in claim 21, and further comprising a step of reducing parallax between a field of view of a source of the stimulus light and a field of view of a source of the excitation light.

37. A method as in claim 36, wherein the step of reducing parallax includes steps of generating a calibration table that relates an output of a system that detects the first emission to a system that points the beam of excitation light; and using the calibration table when pointing the beam of excitation light based on the output of the system that detects the first emission.

38. A method as in claim 21, wherein the step of detecting the second emission comprises steps of spectrally imaging emissions along one axis and spatially imaging emissions along a second axis.

39. A method as in claim 38, wherein the step of decoding comprises a step of analyzing both of the spectrally imaged emissions and the spatially imaged emissions to obtain the information that is descriptive of the at least one characteristic of the object.

40. A method as in claim 21, wherein the step of detecting the first emission uses an emission detector having a field of view; and wherein the field of view of the emission detector is separate from a field of view of a pointing system that points the beam of excitation light.

41. A method as in claim 21, wherein the step of detecting the first emission uses an emission detector having a field of view; and wherein the field of view of the emission detector directed through a pointing system that points the beam of excitation light.

42. A method as in claim 21, wherein the step of detecting the second emission comprises a further step of detecting at least one property of the object.

43. A method as in claim 42, wherein the at least one property is comprised of color.

44. A method as in claim 21, wherein the step of illuminating the at least one portion with stimulus light comprises a step of generating a plurality of wavelengths of light.

45. A method for determining information about an object, comprising steps of:

providing an object so as to have a plurality of regions each comprised of a photonically active material;

illuminating at least a portion of the object with stimulus light;

detecting a first emission from the photonically active material in response to the stimulus light;

identifying a location of each of the plurality of regions from the detected first emission;

pointing a beam of excitation light, in turn, at each of the identified locations for illuminating, in turn, each of the regions with the excitation light;

in response to the excitation light, detecting a second emission from the photonically active material in each of the illuminated regions; and decoding a plurality of the second emissions to obtain information that is descriptive of at least one characteristic of the object.

46. A method for identifying individual ones of a plurality of objects, comprising steps of:

providing each of the plurality of objects so as to have at least one region comprised of a photonically active material;

illuminating the plurality of objects with stimulus light;

detecting from each object a first emission from the photonically active material in response to the stimulus light;

identifying a location of each of the plurality of regions from the detected first emission;

pointing a beam of excitation light, in turn, at each of the identified locations for illuminating, in turn, each of the regions with the excitation light;

in response to the excitation light, detecting a second emission from the photonically active material in each of the illuminated regions; and decoding each of the second emissions to identify individual ones of a plurality of objects.

* * * * *